US008655104B2

(12) United States Patent
Zhang et al.

(10) Patent No.: US 8,655,104 B2
(45) Date of Patent: Feb. 18, 2014

(54) CYCLIC NOISE REMOVAL IN BOREHOLE IMAGING

(75) Inventors: Jun Zhang, Houston, TX (US); Zhipeng Liu, Houston, TX (US); Paul Boonen, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1107 days.

(21) Appl. No.: 12/486,954

(22) Filed: Jun. 18, 2009

(65) Prior Publication Data

US 2010/0322533 A1 Dec. 23, 2010

(51) Int. Cl.
*G06K 9/36* (2006.01)
*G06K 9/40* (2006.01)
*G06K 9/00* (2006.01)
*G06F 15/00* (2006.01)
*H04N 9/47* (2006.01)
*G01V 3/00* (2006.01)

(52) U.S. Cl.
USPC ........... 382/280; 382/275; 382/109; 708/404; 348/85; 340/853.1; 340/853.2; 340/853.3; 340/853.4; 340/853.5; 340/853.6

(58) Field of Classification Search
USPC ................................. 382/275, 280; 708/404; 340/853.1–856.4; 348/85
See application file for complete search history.

(56) References Cited

U.S. PATENT DOCUMENTS

| | | | |
|---|---|---|---|
| 4,039,042 A | 8/1977 | Edwards et al. | |
| 4,763,258 A * | 8/1988 | Engelder | 340/853.3 |
| 5,473,158 A | 12/1995 | Holenka et al. | |
| 5,579,248 A | 11/1996 | Nieto et al. | |
| 5,721,694 A * | 2/1998 | Graupe | 702/191 |
| 5,816,346 A | 10/1998 | Beaton | |
| 6,049,757 A | 4/2000 | Sijercic et al. | |
| 6,094,401 A | 7/2000 | Masak et al. | |
| 6,307,199 B1 | 10/2001 | Edwards et al. | |

(Continued)

FOREIGN PATENT DOCUMENTS

| | | |
|---|---|---|
| WO | 2009014720 A1 | 1/2009 |
| WO | 2012014720 A1 | 2/2012 |

OTHER PUBLICATIONS

Fitz, Dale E., et al.; "Cyclic noise in open-hole and cased-hole logging measurements: Its impact and remediation", SPE Annual Technical Conference and Exhibition, Denver, CO; Oct. 5-8, 2003, SPE 84203.

(Continued)

*Primary Examiner* — Michelle Entezari
(74) *Attorney, Agent, or Firm* — Kimberly Ballew; Christopher Streinz

(57) ABSTRACT

A method for removing cyclic noise from a borehole image includes transforming the image into the frequency domain using a two-dimensional (2-D) Fourier Transform, removing cyclic noise components from the transformed image, and inverse transforming the image back into the spatial domain using an inverse 2-D Fourier Transform. The cyclic noise component may also be isolated by subtracting the corrected image from the original image or by removing all non-cyclic noise components from the transformed image prior to inverse transforming. Removal of the cyclic noise from a borehole image tends to enable the identification of borehole features and provide for improved accuracy in formation parameter evaluation. Evaluation of the cyclic noise component may also enable the source of the noise to be identified and mitigated.

14 Claims, 3 Drawing Sheets

(56) References Cited

U.S. PATENT DOCUMENTS

| | | | |
|---|---|---|---|
| 6,584,837 | B2 | 7/2003 | Kurkoski |
| 6,619,395 | B2 | 9/2003 | Spross |
| 6,659,174 | B2 * | 12/2003 | Hogan ................ 166/250.01 |
| 7,027,926 | B2 | 4/2006 | Haugland |
| 7,609,169 | B2 * | 10/2009 | Aiello ................... 340/854.3 |
| 2003/0004647 | A1 | 1/2003 | Sinclair |
| 2003/0095180 | A1 * | 5/2003 | Montgomery ............ 348/143 |
| 2003/0151975 | A1 | 8/2003 | Zhou et al. |
| 2004/0162676 | A1 | 8/2004 | Thomann et al. |
| 2004/0178330 | A1 | 9/2004 | Tarvin et al. |
| 2006/0222262 | A1 * | 10/2006 | Ueda et al. ............... 382/280 |
| 2006/0256226 | A1 * | 11/2006 | Alon et al. ............... 348/335 |
| 2007/0215345 | A1 | 9/2007 | Lafferty et al. |
| 2007/0223822 | A1 * | 9/2007 | Haugland ................. 382/232 |
| 2008/0068211 | A1 | 3/2008 | Aiello |
| 2009/0072744 | A1 | 3/2009 | Botto et al. |
| 2009/0141943 | A1 | 6/2009 | Liu |
| 2009/0157318 | A1 * | 6/2009 | Woerpel et al. ............... 702/9 |
| 2010/0126770 | A1 * | 5/2010 | Sugiura ...................... 175/38 |
| 2010/0271232 | A1 | 10/2010 | Clark et al. |
| 2010/0305927 | A1 * | 12/2010 | Suarez-Rivera et al. ...... 703/10 |
| 2010/0322533 | A1 | 12/2010 | Zhang et al. |
| 2011/0175899 | A1 * | 7/2011 | Bittar et al. ................ 345/419 |
| 2011/0214878 | A1 | 9/2011 | Bailey et al. |
| 2011/0245980 | A1 | 10/2011 | Nessjoen et al. |

OTHER PUBLICATIONS

Torres, D., et al.; "Real time frequency domain filtering maximizing vertical resolution while minimizing noise", SPWLA Twenty-Ninth Annual Logging Symposium; Jun. 5-8, 1988, pp. 1-20.

Nieto, J.A., et al.; "Removal of borehole induced noise from well logs", SPWLA 36th Annual Logging Symposium, Jun. 26-29, 1995, pp. 1-11.

International Search Report and Written Opinion dated Dec. 6, 2010 for corresponding PCT application No. PCT/US2010/039110 filed Jun. 18, 2010.

Chen, et al., "Hole Quality: Why It Matters", SPE 74403-MS, SPE International Petroleum Conference and Exhibition, Villahermosa, Mexico, 2002, 12 pages.

Sugiura, et al., "The Use of the Industry's First 3-D Mechanical Caliper Image While Drilling Leads to Optimized Rotary-Steerable Assemblies in Push—and Point-the-Bit Configurations", SPE 115395—SPE Annual Technical Conference and Exhibition, Denver, Colorado, USA, Sep. 21-24, 2008, pp. 1-12.

Sugiura, Junichi, "Improving Rotary-Steerable Borehole Quality Using Innovative Imaging Techniques", OTC 19991—Offshore Technology Conference, Houston, Texas, May 4-7, 2009, pp. 1-10.

Sugiura, Junichi, "Novel Mechanical Caliper Image While Drilling and Borehole Image Analysis", SPWLA 50th Annual Logging Symposium, Jun. 21-24, 2009.

\* cited by examiner

CYCLIC NOISE REMOVAL IN BOREHOLE IMAGING

RELATED APPLICATIONS

None.

FIELD OF THE INVENTION

The present invention relates generally to a method for removing cyclical noise from borehole images, for example, including logging while drilling images and wireline images. More specifically, this invention relates to processing the borehole images with a two-dimensional Fourier Transform.

BACKGROUND OF THE INVENTION

Logging while drilling (LWD) techniques for determining numerous borehole and formation characteristics are well known in oil drilling and production applications. Such LWD techniques include, for example, natural gamma ray, spectral density, neutron density, inductive and galvanic resistivity, micro-resistivity, acoustic velocity, acoustic caliper, physical caliper, and the like. As is well known in the art, LWD has enabled the measurement of such borehole and formation parameters to be conducted during the drilling process. The measurement of borehole and formation properties during drilling has been shown to improve the timeliness and quality of the measurement data and to often increase the efficiency of drilling operations.

Borehole imaging has become conventional in logging while drilling applications. Such images provide an indication of the azimuthal sensitivity of various borehole and/or formation properties. LWD imaging applications commonly make use of the rotation (turning) of the bottom hole assembly (BHA) (and therefore the LWD sensors) during drilling of the borehole. For example, Holenka et al., in U.S. Pat. No. 5,473,158, discloses a method in which sensor data (e.g., neutron count rate) is grouped by quadrant about the circumference of the borehole. Likewise, Edwards et al., in U.S. Pat. No. 6,307,199, Kurkoski, in U.S. Pat. No. 6,584,837, and Spross, in U.S. Pat. No. 6,619,395, disclose similar methods. For example, Kurkoski discloses a method for obtaining a binned azimuthal density of the formation. In the disclosed method, gamma ray counts are grouped into azimuthal sectors (bins) typically covering 45 degrees in azimuth. Accordingly, a first sector may include data collected when the sensor is positioned at an azimuth in the range from about 0 to about 45 degrees, a second sector may include data collected when the sensor is positioned at an azimuth in the range from about 45 to about 90 degrees, and so on.

More recently, commonly assigned U.S. Pat. No. 7,027,926 to Haugland discloses a technique in which LWD sensor data is convolved with a one-dimensional window function. This approach advantageously provides for superior image resolution and noise rejection as compared to the previously described binning techniques. Commonly assigned, co-pending U.S. Patent Publication 2009/0030616 to Sugiura describes another image constructing technique in which sensor data is probabilistically distributed in either one or two dimensions (e.g., azimuth and/or measured depth). This approach also advantageously provides for superior image resolution and noise rejection as compared to prior art binning techniques. Moreover, it further conserves logging sensor data (i.e., the data is not over or under sampled during the probabilistic distribution) such that integration of the distributed data may also provide a non-azimuthally sensitive logging measurement.

One problem with conventional LWD imaging techniques is that the obtained images commonly include cyclical or oscillating noise. For example, a spiralling effect is commonly observed in borehole images. This effect may be caused by a spiralling (or helically shaped) borehole or by periodic oscillations in the borehole diameter. Such cyclic noise often complicates the interpretation of borehole image data, for example, the identification of various geological features and the quantitative determination of formation parameters, such as formation thickness, dip and dip azimuth etc. Therefore, there is a need in the art for improved borehole imaging techniques and in particular a method for removing and/or quantifying cyclical noise on borehole images.

SUMMARY OF THE INVENTION

The present invention addresses one or more of the above-described drawbacks of prior art borehole imaging techniques. One aspect of the invention includes a method for removing cyclic noise from an LWD or wireline borehole image. The image is first transformed into the frequency domain using a two-dimensional (2-D) Fourier Transform, such as a 2-D Fast Fourier Transform (FFT). The cyclic noise components (peaks) are then identified and removed from the transformed image. The transformed image may then be inverse transformed back into the spatial domain using an inverse 2-D Fourier Transform to obtain a corrected image. The cyclic noise may also be isolated by subtracting the corrected image from the original image. In another aspect of the invention, the cyclic noise may also be isolated by removing all non-cyclic noise components from the transformed image and then inverse transforming the remaining noise components.

Exemplary embodiments of the present invention may advantageously provide several technical advantages. For example, removal of the cyclic noise from a borehole image tends to enable the identification of features (such as thin beds, fractures, vugs, and borehole break-outs) that would not have otherwise been identifiable. Moreover, removal of the cyclic noise also tends to provide for improved accuracy in formation parameter evaluation, such as formation thickness, dip, and dip azimuth angle determination. Images of the cyclic noise may also be advantageously utilized to estimate borehole shape parameters, for example, a spiral period (or frequency) of the well. Evaluation of cyclic noise images along with the BHA configuration and various drilling parameters may also enable the source of the noise to be identified and mitigated, e.g., in subsequent drill runs.

In one aspect the present invention includes a method for removing cyclic noise from a borehole image. The method includes acquiring a borehole image and transforming the acquired image into a frequency domain using a two-dimensional Fourier Transform to obtain a transformed image. The method further includes removing a cyclic noise component from the transformed image to obtain a masked transformed image and inverse transforming the masked transformed image using a two-dimensional inverse Fourier Transform to obtain a filtered image. In one exemplary embodiment, the invention further includes subtracting the filtered image from the originally acquired borehole image to obtain a cyclic noise image.

In another aspect, the invention includes a method for removing cyclic noise from a borehole image. The method includes acquiring a borehole image and transforming the acquired image into a frequency domain using a two-dimensional Fourier Transform to obtain a transformed image. The method further includes removing non-cyclic noise components from the transformed image to obtain a transformed noise image and inverse transforming the transformed noise image using a two-dimensional inverse Fourier Transform to obtain a cyclic noise image.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
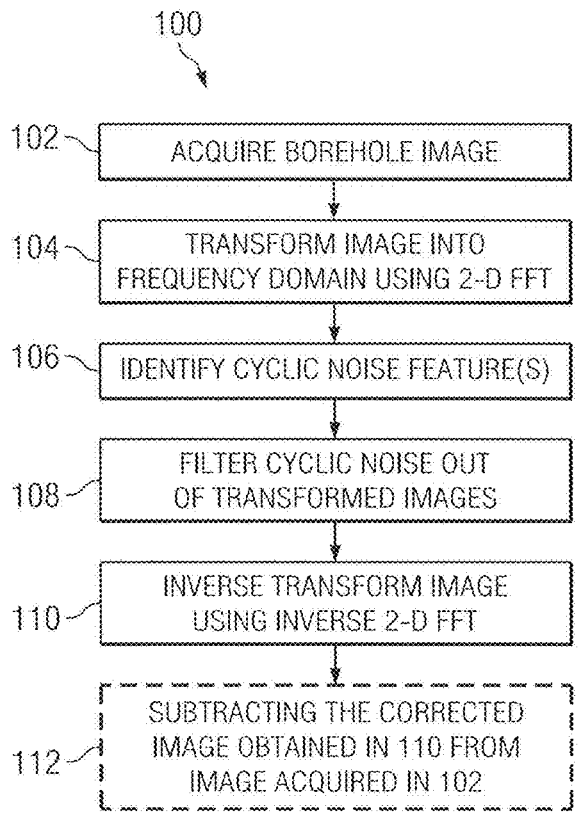
FIG. 1 depicts a flowchart of one exemplary method embodiment in accordance with the present invention.

FIG. 1 depicts a flow chart of one exemplary method embodiment 100 in accordance with the present invention. Method 100 includes acquiring a borehole image at 102. The borehole image may include measurements obtained from substantially any suitable sensor, for example, including at least one natural gamma ray sensor, neutron sensor, density sensor, directional resistivity sensor, micro-resistivity sensor, galvanic resistivity sensor, formation pressure sensor, annular pressure sensor, ultrasonic sensor, audio-frequency acoustic sensor, ultrasonic sensor, or physical caliper sensor, optical sensor, and the like. While the invention is not limited in regards to the sensor type, certain sensors are more susceptible to cyclic borehole affects and therefore to cyclical errors. These include micro-resistivity, ultra-sonic, density, gamma-ray, physical caliper sensors.

Before proceeding further with a discussion of the present invention, it is necessary to make clear what is meant by the term "image" as used herein. In general an image may be thought of as a two-dimensional representation of a parameter value determined at discrete positions. For the purposes of this disclosure, a borehole image may be thought of as a two-dimensional representation of a measurement (e.g., gamma ray counts, micro-resistivity, etc.) at discrete circumferential positions (e.g., azimuth angles) and measured depths of the borehole. Such images thus convey the dependence of the measurement on the circumferential position and the measured depth. It will therefore be appreciated that one purpose in forming such images is to determine the actual dependence of the sensor measurement (and the corresponding formation properties) on the circumferential position and measured depth. The extent to which a measured image differs from the "true image" may be thought of as image distortion (or noise). Such distortion may be related, for example, to the above described cyclical noise. Removal of this noise source advantageously improves the usefulness of borehole images in determining the actual dependence of the sensor measurements (and therefore formation properties) on the circumferential position and the measured depth of the borehole.

In LWD applications, the circumferential position is commonly referred to as an azimuth angle. In particular, the term azimuth angle refers to the angular separation from a point of interest to a reference point. The azimuth angel is typically measured in the clockwise direction (although the invention is not limited in this regard), and the reference point is frequently the high side of the borehole or measurement tool, relative to the earth's gravitational field, or magnetic north. Another label commonly used in the LWD imaging context is the "toolface" angle. When a measurement tool is used to gather azimuthal imaging data, the point of the tool with the measuring sensor is identified as the "face" of the tool. The toolface angle, therefore, is defined as the angular separation about the circumference of the tool from a reference point to the radial direction of the toolface. In wireline applications, the circumferential position is commonly referred to as a relative bearing (e.g., a bearing angle relative to magnetic north). In the remainder of this document, the term azimuth angle is predominantly used to refer to circumferential positions on the borehole.

With reference again to FIG. 1, the borehole image may be acquired, for example, from a memory type tool (e.g., an LWD or wireline imaging tool) after it has been removed from the borehole (i.e., from tool memory). The borehole image may also be acquired at the surface in real time during logging via a communication link with the downhole tool (e.g., via wireline cable, conventional mud pulse, or other telemetry techniques). The invention in not limited in these regards.

Methods in accordance with the present invention further include inspecting the acquired image for cyclic noise (e.g., via a visual inspection) and transforming (at 104) the acquired borehole image into the frequency domain using a two-dimensional (2-D) Fourier Transform when cyclic noise is observed. In preferred embodiments of the invention, a 2-D Fast Fourier Transform (FFT) is utilized. Suitable 2-D FFTs are available, for example, via commercial software such as MathCad® or Mathematica® (Wolfram Research, Inc., Champaign, Ill.), or MATLAB® (The Mathworks Inc.). After transforming the image into the frequency domain, the transformed image is examined for features indicative of cyclic noise at 106. Cyclic noise is typically manifest as a plurality of periodic peaks (or bright spots) in the frequency domain corresponding to the frequency component (or components) of the noise. For example, a spiraling borehole typically produces cyclic noise having a frequency component related to the period (or frequency) of the spiral. The cyclic noise may be identified manually or using an automated routine.

Once identified, a filter/mask may be constructed to remove these cyclic noise features from the transformed image at 108. The filter is preferably custom configured for removal of the identified noise features. In this way, there is minimal distortion to the original image. After removal of the cyclic noise feature(s), the transformed image is inverse transformed at 110, for example, using a 2-D inverse FFT to obtain a reconstructed (or corrected) borehole image having reduced cyclic noise. Such inverse transforms are also readily available via commercial software packages. After removal of the cyclic noise, the reconstructed image may be evaluated to obtain various borehole and/or formation parameters using techniques known to those of ordinary skill in the art.

With continued reference to FIG. 1, methods in accordance with the invention may further include subtracting (at 112) the corrected image (obtained at 110) from the original image (acquired at 102) to obtain a cyclic noise image. This cyclic noise image may be further evaluated to provide an indication of borehole quality. When evaluated in real time during drilling, evaluation of the cyclic noise image may help in identifying the source of the noise and its fixture mitigation. Cyclic noise may also be caused by other periodic sensor noise sources.

Figure 2:
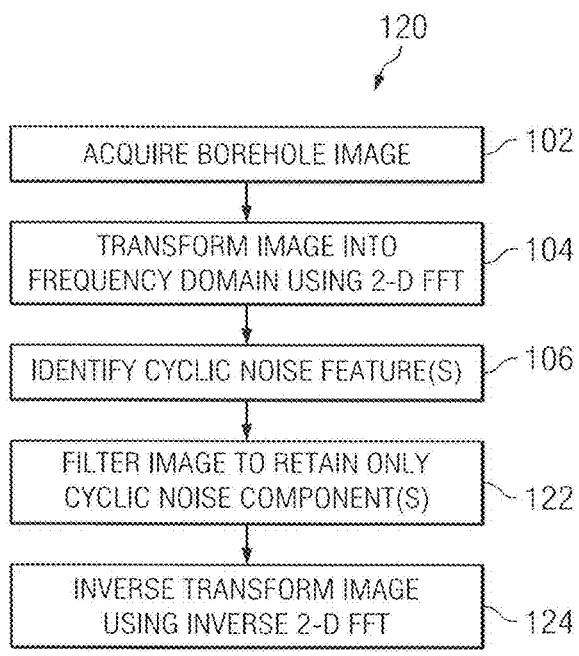
FIG. 2 depicts a flowchart of another exemplary method embodiment in accordance with the present invention.

With reference now to FIG. 2 a flow chart of an alternative method embodiment 120 in accordance with the invention is depicted. Method embodiment 120 is similar to method embodiment 100 (FIG. 1) in that it includes acquiring a borehole image at 102, transforming the image into the frequency domain using a 2-D FFT at 104, and evaluating the image for cyclic noise features at 106. At 122, a filter is applied to the transformed image so that it retains only the cyclic noise component (peaks) of the transformed image. This filtered image is then inverse transformed, for example, using a 2-D inverse FFT to obtain a reconstructed borehole image of the cyclic noise at 124. The reconstructed image of the cyclic noise may be evaluated in a similar manner to the image acquire at 112 of FIG. 1 to provide an indication of borehole quality.

Figure 3:
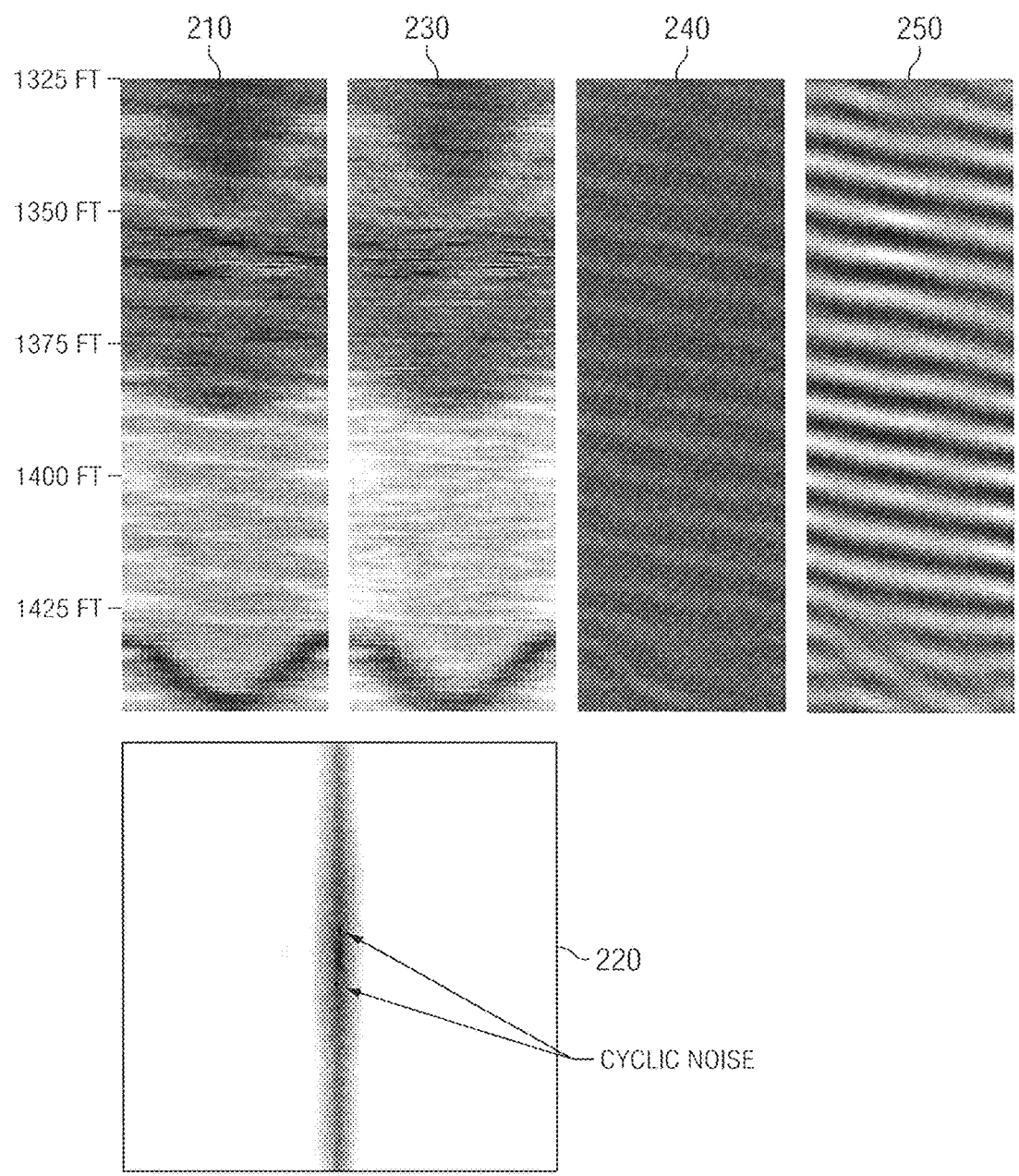
FIG. 3 depicts exemplary borehole images processed in accordance with the present invention.

The present invention is now described in further detail with respect to the following example, which is intended to be purely exemplary and therefore should not be construed in any way as limiting its scope. Referring now to FIG. 3, an LWD density image is depicted for a section of a subterranean borehole. The original image is shown at 210 and includes a cyclic noise component indicative of a spiraling borehole. This effect is common in borehole imaging applications and is known to have an adverse effect on formation evaluation (Chen et al., *SPE 74403-MS, SPE International Petroleum Conference and Exhibition in Mexico,* 10-12 Feb. 2002).

A 2-D FFT was applied to the original density image to obtain a transformed image in the frequency domain (as described above with respect to FIG. 1). This transformed image is depicted at 220, with the cyclic noise component (dark spots) being depicted (FIG. 3 depicts a negative of the transformed image). The cyclic noise peaks were removed from the transformed image (via a mask) and an inverse 2-D FFT was applied to obtain a corrected image (as described above with respect to FIG. 1). This corrected image is depicted at 230. Visual examination of the corrected image clearly shows that the cyclic noise component has been removed (or significantly reduced in magnitude). As will be appreciated by those of ordinary skill in the downhole logging arts, removal of the cyclic noise component simplifies interpretation of the borehole image. For example, the high density bed (light color) at about 1330 feet is more clearly defined in the corrected image obtained using the present invention. Moreover, the boundary is smooth and is therefore suitable for determination of formation dip. A second high density bed (light color) may also be distinguished at about 1345 feet. The formation structure in this zone (from about 1330 to about 1345 feet) may be interpreted to include first and second thin, high density beds superposed about a thin, low density bed (i.e., a low density bed sandwiched between two high density beds). Prior to removal of the cyclic noise evaluation of these features was difficult (if not impossible).

Figure 4:
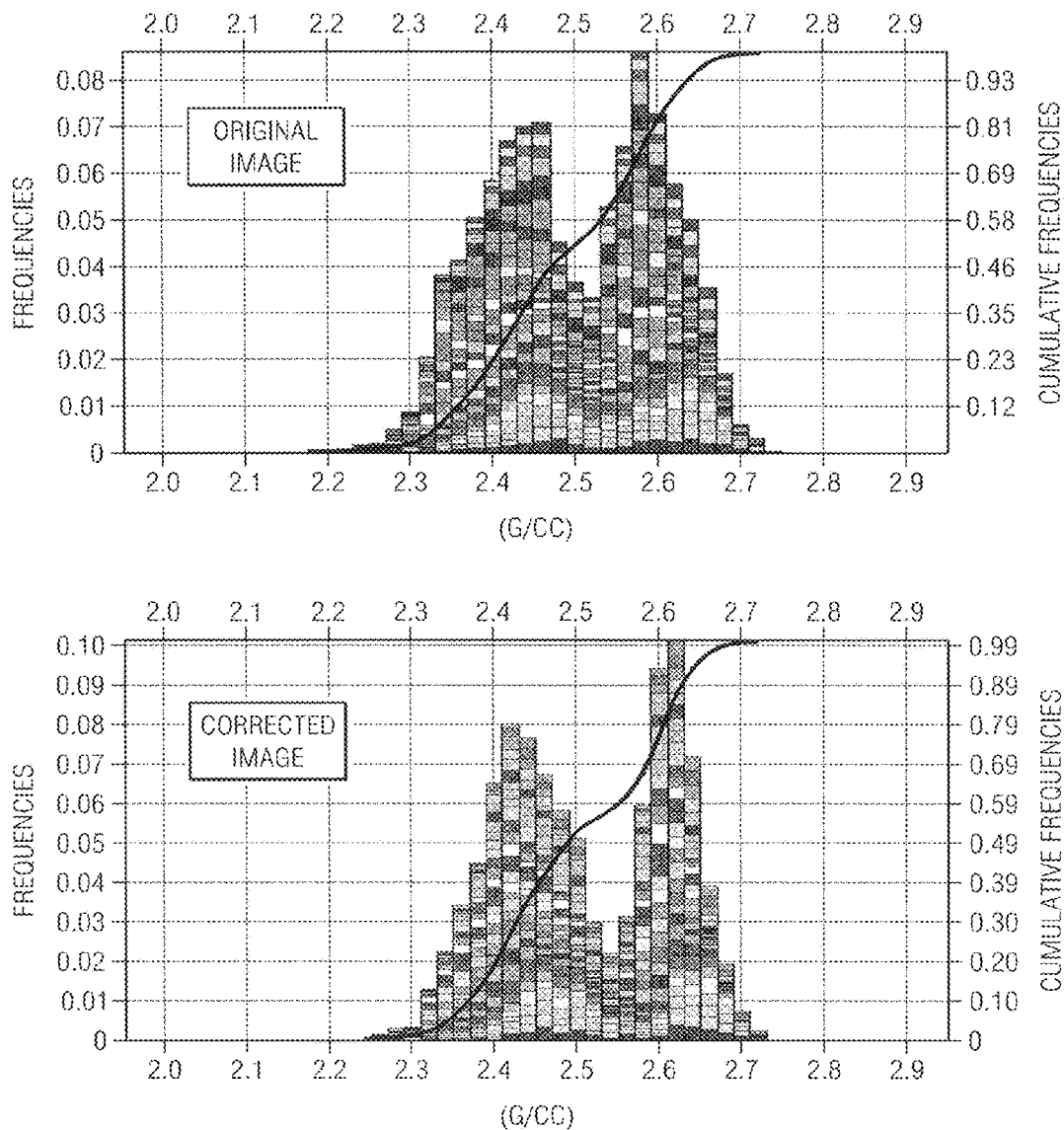
FIG. 4 depicts histograms from the borehole images shown on FIG. 3.

FIG. 4 depicts histograms of the original and corrected images. As shown, the histograms of the original and corrected images remain statistically similar. However, the histogram of the corrected image indicates a slightly higher average density (2.51 g/cc versus 2.50 g/cc). This is to be expected since the LWD density sensor is less likely to contact the borehole wall in a spiraling borehole, which results in density measurements that are more likely to be affected by low density drilling fluid. In a sandstone formation, the density measurements given above correspond to formation average porosity values of 9.1 p.u. and 8.3 p.u., respectively. Removal of the borehole spiral results in a corrected porosity error of 0.8 p.u. (a relative error of about 10 percent).

With reference again to FIG. 3, cyclic noise images are also depicted at 240 and 250. The first cyclic noise image 240 was obtained via subtracting the original image 210 from the corrected image 230. The second cyclic noise image 250 was obtained by retaining only the cyclic noise peaks 222 in the transformed image. All other frequency components were removed prior to the inverse transformation step. These noise images 240 and 250 are similar in that both show a strong borehole spiraling affect. The spirals are regularly spaced having a period of about 6.9 feet (images 240 and 250 show 17 spirals per 117 feet of measured depth). This spiral period is about the same as the distance from the top of the drill bit to the adjustable bend of the drilling motor in the BHA used to drill the borehole (6.9 vs. 6.7 feet), indicating that the BHA configuration may have been at least partly responsible for the spiraling borehole. Evaluation of the cyclic noise may therefore prove useful in identifying and mitigating causes of borehole spiraling.

Although the present invention and its advantages have been described in detail, it should be understood that various changes, substitutions and alternations can be made herein without departing from the spirit and scope of the invention as defined by the appended claims.

We claim:

1. A method for obtaining a cyclic noise image from a borehole image, the method comprising:
    (a) acquiring a borehole image;
    (b) causing a surface processor to transform the borehole image acquired in (a) into a frequency domain using a two-dimensional Fourier Transform to obtain a transformed image;
    (c) removing a cyclic noise component from the transformed image obtained in (b) to obtain a masked transformed image;
    (d) causing the surface processor to inverse transform the masked transformed image obtained in (c) using a two-dimensional inverse Fourier Transform to obtain a filtered image;
    (e) causing the surface processor to subtract the filtered image obtained in (d) from the borehole image acquired in (a) to obtain a cyclic noise image; and
    (f) processing the single cyclic noise image obtained in (e) to obtain a spiral period of the cyclic noise in the image.

2. The method of claim 1, wherein the two-dimensional Fourier Transform is a two-dimensional Fast Fourier Transform and the two-dimensional inverse Fourier Transform is a two-dimensional inverse Fast Fourier Transform.

3. The method of claim 1 wherein the borehole image acquired in (a) comprises a two dimensional image of a logging sensor measurement at discrete azimuth angles and measured depths in a borehole.

4. The method of claim 3, wherein the logging sensor measurement is acquired from a micro-resistivity sensor, an ultrasonic sensor, a density sensor, a gamma-ray sensor, or a physical caliper sensor.

5. The method of claim 1, further comprising:
(g) processing the filtered image obtained in (d) to obtain at least one formation parameter.

6. The method of claim 1, further comprising:
(g) processing the spiral period obtained in (f) with a bottom hole assembly (BHA) configuration to determine a cause of the cyclic noise.

7. A method for obtaining a cyclic noise image from a borehole image, the method comprising:
(a) acquiring a borehole image;
(b) causing a surface processor to transform the borehole image acquired in (a) into a frequency domain using a two-dimensional Fourier Transform to obtain a transformed image;
(c) removing non-cyclic noise components from the transformed image obtained in (b) to obtain a transformed noise image; and
(d) causing the surface processor to inverse transform the transformed noise image obtained in (c) using a two-dimensional inverse Fourier Transform to obtain a cyclic noise image; and
(e) processing the single cyclic noise image obtained in (d) to obtain a spiral period of the cyclic noise in the image.

8. The method of claim 7, wherein the two-dimensional Fourier Transform is a two-dimensional Fast Fourier Transform and the two-dimensional inverse Fourier Transform is a two-dimensional inverse Fast Fourier Transform.

9. The method of claim 7, wherein:
the borehole image acquired in (a) comprises a two dimensional image of a logging sensor measurement at discrete azimuth angles and measured depths in a borehole; and
the logging sensor measurement is acquired from a micro-resistivity sensor, an ultrasonic sensor, a density sensor, a gamma-ray sensor, or a physical caliper sensor.

10. The method of claim 7, further comprising:
(f) processing the spiral period obtained in (e) with a bottom hole assembly (BHA) configuration to determine a cause of the cyclic noise.

11. The method of claim 1, wherein the spiral period is representative of a corresponding borehole spiral, the spiral period being expressed in units of borehole depth and indicating a period of the borehole spiral.

12. The method of claim 7, wherein the spiral period is representative of a corresponding borehole spiral, the spiral period being expressed in units of borehole depth and indicating a period of the borehole spiral.

13. The method of claim 1, wherein the spiral period is expressed in units of a number of spirals per measured depth interval in a borehole.

14. The method of claim 7, wherein the spiral period is expressed in units of a number of spirals per measured depth interval in a borehole.

* * * * *